United States Patent [19]

LeBlanc et al.

[11] Patent Number: 5,464,102
[45] Date of Patent: Nov. 7, 1995

[54] FOLDABLE APPARATUS FOR TRANSPORTING FILLED PLASTIC GROCERY BAGS

[76] Inventors: Wayne LeBlanc; Janiene LeBlanc, both of 8805 Tanglewild Pl., River Ridge, La. 70123

[21] Appl. No.: 288,491

[22] Filed: Aug. 10, 1994

[51] Int. Cl.⁶ ....................................................... A47F 5/00
[52] U.S. Cl. ............................... 211/12; 211/73; 211/195; 224/925; 248/97
[58] Field of Search .............................. 224/925; 211/73, 211/72, 12, 195; 248/95, 97

[56] References Cited

U.S. PATENT DOCUMENTS

| | | |
|---|---|---|
| 3,687,408 | 8/1972 | Lake . |
| 3,730,354 | 5/1973 | Bronstein .......................... 211/195 X |
| 3,737,129 | 6/1973 | Foster . |
| 4,189,056 | 2/1980 | Majewski ............................... 211/195 |
| 4,194,654 | 3/1980 | Badger . |
| 4,322,048 | 3/1982 | Vollman . |
| 4,364,534 | 12/1982 | Valesko . |
| 4,623,111 | 11/1986 | Prader . |
| 4,893,769 | 1/1990 | Rotelli . |
| 5,050,825 | 9/1991 | Bratset . |
| 5,129,609 | 7/1992 | Tobin . |
| 5,129,612 | 7/1992 | Beaupre .............................. 224/925 X |
| 5,292,093 | 3/1994 | Shumake . |
| 5,340,183 | 8/1994 | Horian ................................ 224/925 X |
| 5,366,189 | 11/1994 | Thompson ................................ 248/97 |

*Primary Examiner*—Robert W. Gibson, Jr.
*Attorney, Agent, or Firm*—Sessions & Fishman

[57] ABSTRACT

A foldable apparatus for transporting filled plastic grocery bags in an upright position during transport to alleviate spilling. The foldable apparatus is provided with a foldable platform that folds or pivots in relation to a bag positioning member to configure the apparatus in an open position for receiving and holding filled plastic grocery bags and a closed position to configure the apparatus for storage. Bag retaining ends are provided in the upper section of the bag positioning member to receive and hold the loop handles of plastic grocery bags.

12 Claims, 2 Drawing Sheets

FOLDABLE APPARATUS FOR TRANSPORTING FILLED PLASTIC GROCERY BAGS

FIELD OF THE INVENTION

The present invention relates to a foldable apparatus for transporting filled plastic grocery bags or the like in an upright position to alleviate spilling of the contents of the plastic grocery bags during transport.

BACKGROUND OF THE INVENTION

It has become commonplace in grocery stores and other retail establishments to provide plastic bags to facilitate the handling of purchased items. The plastic grocery bags have been an enormous convenience to consumers as the integral loop handle makes it easier to carry the bags. While the plastic grocery bag may be convenient for carrying items, once the bag is placed in a vehicle for transport home, the bag tends to collapse and the contents thereof susceptible to spilling. The problem of spilling has been addressed in U.S. Pat. No. 5,050,825 issued Sep. 24, 1991 to Bratset. The Bratset patent discloses a grocery bag support having a base and an upright member, detachably secured to the base, which is designed to receive and support the loop handles of plastic grocery bags to enable the bags to travel in an upright position. The grocery bag support disclosed in the Bratset patent is disadvantaged in that it requires two separate pieces (i.e., the base member and the upright member). The upright member must be inserted into brackets contained in the base member to configure the support for use. To disassemble and store the grocery bag support, the upright member must be detached from the base.

It is accordingly an object of the present invention to provide a novel, foldable apparatus for transporting filled plastic grocery bags which obviates the problems of the prior art and which may be easily folded into place for use and easily disassembled for storage.

SUMMARY OF THE INVENTION

The foldable apparatus of the present invention is a one piece design having a foldable platform which provides a stable base for a bag positioning member which is held upright and perpendicular to the foldable platform during use for maintaining plastic grocery bags in an upright position. The bag positioning member has an upper section forming bag retaining ends that receive and hold the loop handles of the plastic grocery bags.

The apparatus is easily disassembled and stored by folding or pivoting the foldable platform so that the apparatus can lay substantially flat in a vehicle for storage.

DETAILED DESCRIPTION OF PREFERRED EMBODIMENTS

Figure 1:
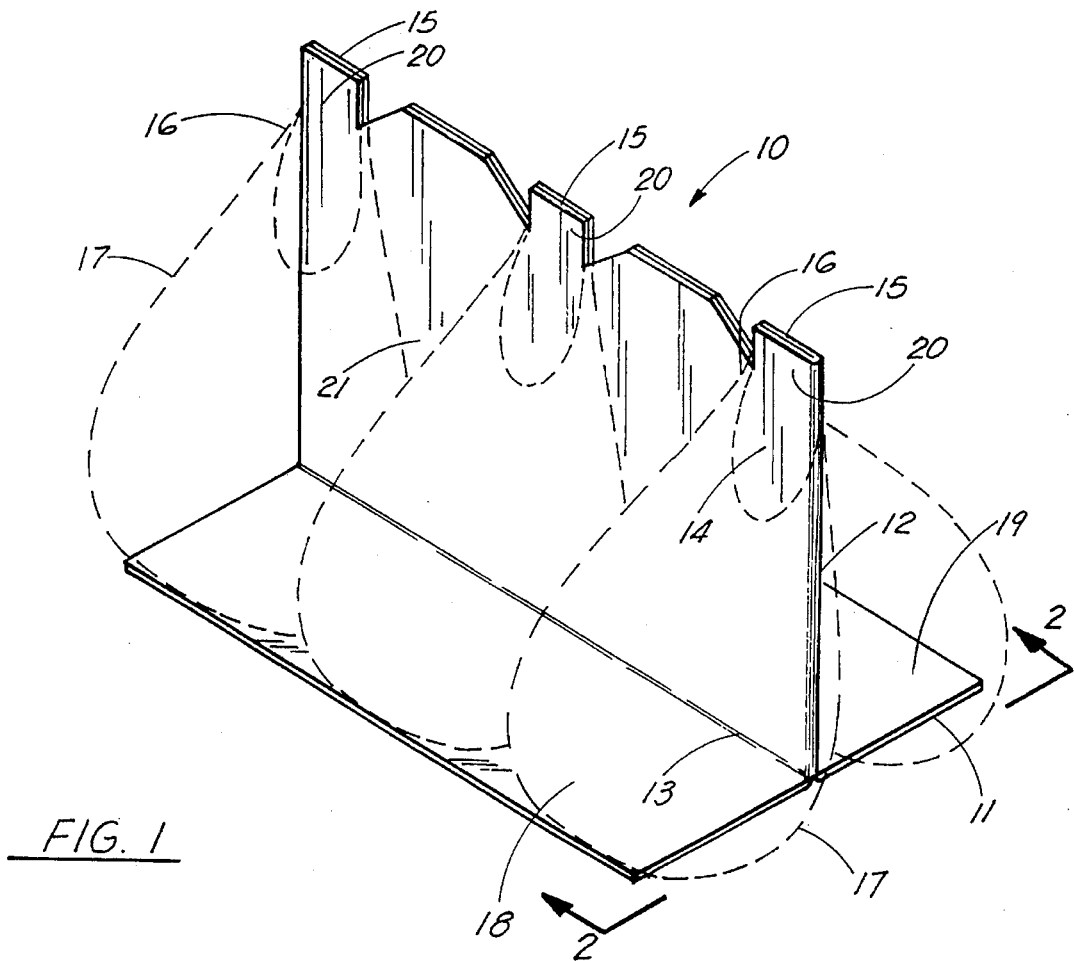
FIG. 1 is a perspective view of an embodiment of the foldable apparatus of the present invention in an open position as it would be configured for use and shown with the outline of plastic grocery bag attached thereto.

With reference to the figures where like elements have been given like numerical designation to facilitate an understanding of the present invention, and particularly with reference to FIG. 1, the foldable apparatus for transporting plastic grocery bags 10 may be constructed of a foldable platform 11 and a bag positioning member 12 which extends substantially perpendicular from foldable platform 11 when foldable platform 11 is in an open position (when apparatus 10 is configured for use). Bag positioning member 12 may have an upper section 14 forming two or more bag retaining ends 15 which are adapted to receive and hold loop handles 16 of plastic grocery bags 17.

Figure 2:
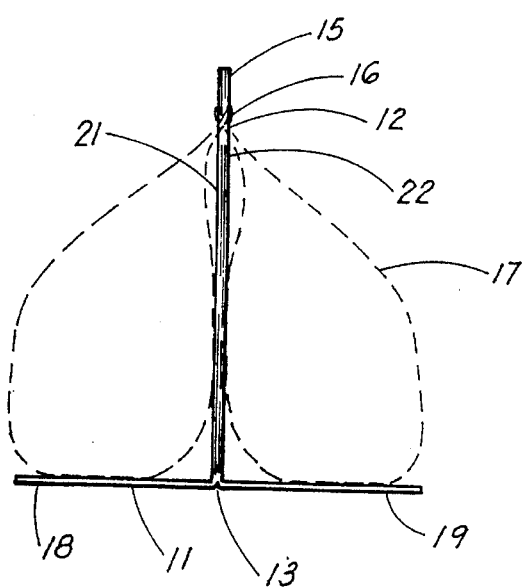
FIG. 2 is an end view of an embodiment of the foldable apparatus of the present invention taken from 2—2 of FIG. 1 and shown with two filled plastic grocery bags attached thereto.
Figure 4:
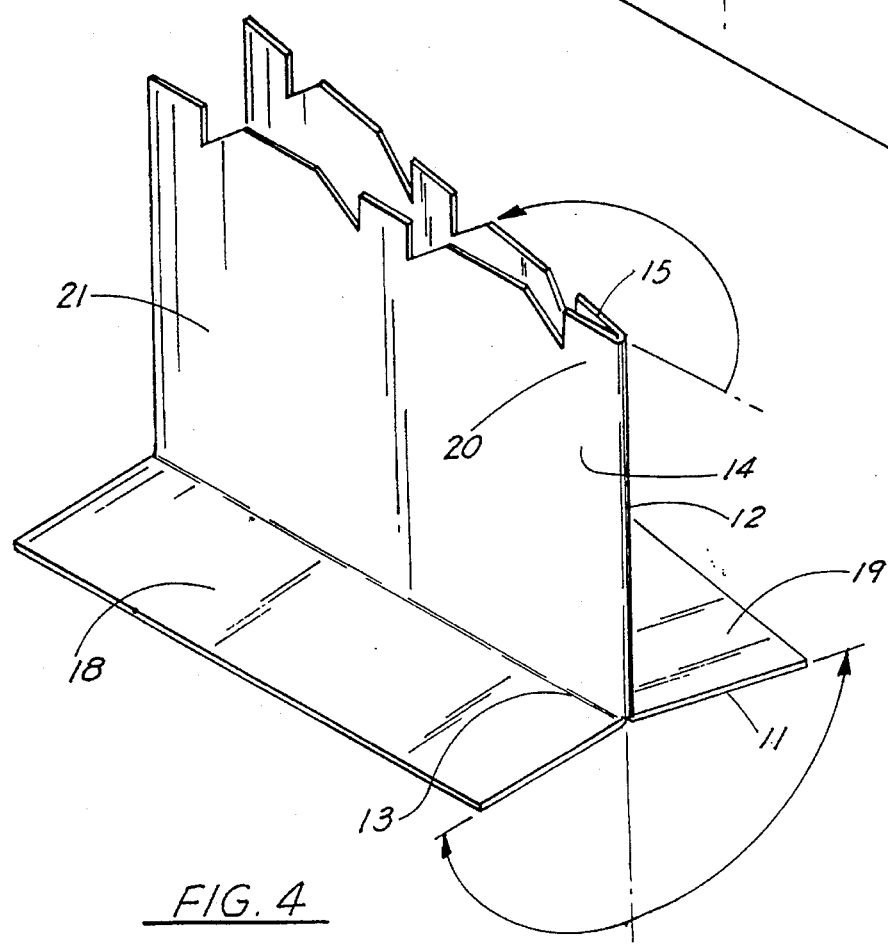
FIG. 4 is a perspective view of an embodiment of the foldable apparatus of the present invention being folded for assembly as the foldable apparatus of the present invention in an upright position.

As perhaps seen more clearly in FIGS. 1, 2, and 4, foldable platform 11 has (1) an open position (when apparatus 10 is configured for use) for receiving and supporting two or more filled plastic grocery bags 17 and (2) a closed position (when apparatus 10 is configured for storage) for storage of apparatus 10 in a flat position. In the open position, foldable platform 11 maintains bag positioning member 12 in a substantially upright position. Bag positioning member 12 maintains plastic grocery bags 17 in an upright position during transport to alleviate the spilling of the contents thereof. In the closed position, foldable platform 11 is configured by folding or pivoting foldable platform 11 in such a way that apparatus 10 is able to lay substantially flat for storage, for example, in the trunk of a vehicle.

Preferably, bag positioning member 12 is secured to foldable platform 11 about the center 13 thereof. It is especially preferred if bag positioning member 12 is secured along the entire length of foldable platform 11. Preferably, bag positioning member 12 is permanently secured to foldable platform 11 such that apparatus 10 is a one-piece design. While various securing mechanisms may be utilized, it is preferred that bag positioning member 12 be an integral component of foldable platform 11, rather than secured by hinges or other similar connecting devices.

Again as shown in FIGS. 1, 2 and 4, foldable platform 11 may have a left flap 18 and a right flap 19 which pivot about bag positioning member 12 to define the open and closed positions. It is preferred if left flap 18 and right flap 19 are separate pieces having substantially equal dimensions. Apparatus 10 is stored by folding or pivoting flaps 18 and 19 in relation to bag positioning member 12 such that when either the front side 21 or back side 22 of bag positioning member 12 is laid flat against a surface (e.g., the trunk of a vehicle), bag positioning member 12 is able to lay substantially flat. When foldable platform 11 is in a closed position, left flap 18 and right flap 19 each may form an angle with bag positioning member 12 to permit apparatus 10 to lie substantially flat for storage. The angle formed by left flap 18 and right flap 19 may be in the range of 0 to 30°. More preferably, the angle is in the range of 5° to 30°. The angle may also be in the range of 130° to 180° and more preferably, 150° to 180°. Thus, left flap 18 and right flap 19 may be folded either towards bag positioning member 12 or away therefrom.

With reference to FIG. 2, foldable platform 11 is in an open position when left flap 18 and right flap 19 each form an angle with bag positioning member 12 to permit bag positioning member 12 to stand substantially upright for receiving and holding loop handles 16 of plastic grocery bags 17. It is preferred that the angle of left flap 18 and right flap 19 each be about 90°.

As demonstrated in FIG. 1, upper section 14 of bag positioning member 12 may form bag retaining ends 15 which may be adapted to receive and hold loop handles 16 of filled plastic grocery bags 17. It is preferred if upper section 14 forms three bag retaining ends 15. Preferably, bag retaining ends 15 are configured as posts 20. In this configuration, posts 20 act to receive and hold loop handles 16 so that plastic grocery bags 17 are maintained in an upright position.

It is to be understood that bag retaining ends 15 are merely designed to receive and hold loop handles 16 of plastic grocery bags 17 and not to support the weight of filled plastic grocery bags 17. Rather, the weight of the items of filled plastic grocery bags 17 are supported by foldable platform 11.

While apparatus 10 may be made from many different materials, apparatus 10 desirably is constructed of cardboard or plastic having a thickness of ¼ inch. Foldable platform 11 may be rectangular in design having a width in the range of 5 to 10 inches. It is most preferred if the width is about 7 inches. The length of foldable platform 11 may be in the range of 15 to 25 inches. It is most preferred if the length is about 23 inches. Although not necessary, bag positioning member 12 may have a length comparable to the length of the foldable platform 11. Additionally, bag positioning member 12 may have a length in the range of 15 to 23 inches, with a length of about 23 inches being most preferred.

The number of plastic grocery bags which may be held upright by the apparatus 10 is dependent on the number of bag retaining ends 15. It is preferred if apparatus 10 has three bag retaining ends 15. Since each bag retaining end 15 may hold two filled plastic grocery bags on opposite sides, apparatus 10 may hold up to six (6) filled plastic grocery bags 17. Filled plastic grocery bags 17 should be positioned on opposite sides of bag retaining ends 15 to counter-balance the filled plastic grocery bags 17. Moreover, it has been discovered that filled plastic grocery bags 17 having similar weight should be placed opposite each other about apparatus 10.

Figure 3:
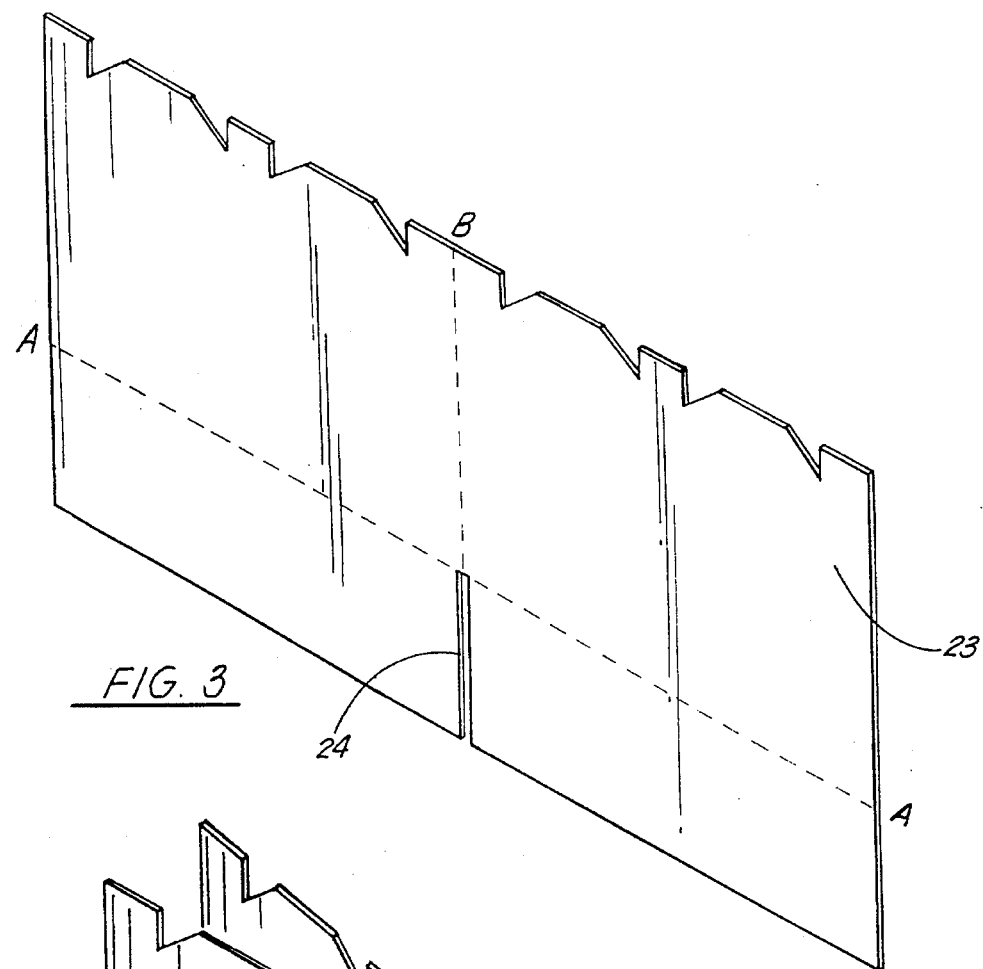
FIG. 3 is perspective view of a pre-assembled embodiment of the foldable apparatus of the present invention in an upright position.

Apparatus 10 may be constructed from a single piece of corrugated cardboard piece 23 as shown in FIG. 3. Preferably, cardboard piece 23 measures approximately 46 inches in width and about 20½ inches in length. As a first step in the manufacturing process, cardboard piece 23, which is laying flat, is printed. Once the printing is completed, cardboard piece 23 is die cut to form bag retaining ends 15 at the top side thereof. Cardboard piece 23 is then scored along line A—A which may be about 7 inches from the bottom side thereof to form left flap 18 and right flap 19. Cardboard piece 23 is then scored along its center along line B—B to facilitate folding thereof. Cut 24 is then made in cardboard piece 23 from about the center of its bottom side to the scoring which forms left flap 18 and right flap 19. As shown in FIG. 4, cardboard piece 23 is then folded upon itself along the center scoring to form apparatus 10. When folded, apparatus 10 may be permanently secured via the use of glue or cement. However, other securing methods, such as stapling or the like, may also be used.

The same methods may be utilized in constructing apparatus 10 if said apparatus 10 is instead made of a plastic material. However, rather than scoring along the width of the apparatus 10 to form left flap 18 and right flap 19, hinges could be used to attach left flap 18 and right flap 19 to bag positioning member 12. In this construction, foldable platform 11 is a separate component and is not an integral molded component with bag positioning member 12. The hinges may be attached by either a heat fusion method or through the use of screws, although other methods for securing left flap 18 and right flap 19 may be utilized.

While preferred embodiments of the present invention have been described, it is to be understood that the embodiments described are illustrated only, and that the scope of the invention is to be defined solely by the appended claims when accorded a full range of equivalents, many variations and modifications naturally occurring to those skilled in the art from a perusal hereof.

We claim:

1. An apparatus for transporting filled plastic grocery bags having loop handles, comprising:

a foldable platform having an open position for receiving and supporting two or more filled plastic grocery bags and a closed position for storage of said apparatus;

a bag positioning member secured to said foldable platform about the center thereof and extending substantially perpendicular therefrom when said foldable platform is in said open position; said bag positioning member having an upper section forming two or more bag retaining ends each adapted to receive and hold said loop handles of the filled plastic grocery bags.

2. The apparatus according to claim 1, wherein said foldable platform has a left flap and a right flap of substantially equal dimensions which each pivot about said bag positioning member to define said open and closed positions.

3. The apparatus according to claim 2, wherein said foldable platform is in said closed position with said left flap and said right flap each forming an angle with said bag positioning member to permit said apparatus to lie substantially flat for storage thereof.

4. The apparatus according to claim 3, wherein said angle is in the range of 0 to 30 degrees.

5. The apparatus according to claim 3, wherein said angle is in the range of 130 to 180 degrees.

6. The apparatus according to claim 2, wherein said foldable platform is in said open position with said left flap and said right flap each forming an angle with said bag positioning member to permit said bag positioning member to stand substantially upright for receiving and holding said loop handles of the plastic grocery bags.

7. The apparatus according to claim 6, wherein said angle is about 90 degrees.

8. The apparatus according to claim 1, wherein said bag positioning member is secured to said foldable platform along the along the entire center thereof.

9. The apparatus according to claim 1, wherein said upper section has three bag retaining ends.

10. The apparatus according to claim 1, wherein said two or more bag retaining ends are configured as posts each adapted to receive and hold said loop handles of the filled plastic grocery bags.

11. The apparatus according to claim 1, wherein said apparatus is made of cardboard.

12. The apparatus according to claim 1, wherein said apparatus is made of plastic.

* * * * *